United States Patent
Ma et al.

(10) Patent No.: US 7,738,444 B2
(45) Date of Patent: *Jun. 15, 2010

(54) ITU H450.1-BASED ITU H.323 SCP METHOD AND APPARATUS

(75) Inventors: Jin Yu (Gene) Ma, Irvine, CA (US);
Linghe (Henry) Wang, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 1533 days.

This patent is subject to a terminal disclaimer.

(21) Appl. No.: 11/051,065

(22) Filed: Feb. 4, 2005

(65) Prior Publication Data

US 2005/0129210 A1 Jun. 16, 2005

Related U.S. Application Data

(63) Continuation of application No. 09/608,276, filed on Jun. 30, 2000, now Pat. No. 6,868,090.

(51) Int. Cl.
*H04L 12/66* (2006.01)
(52) U.S. Cl. .................... 370/352; 379/221.09
(58) Field of Classification Search .............. 370/352
See application file for complete search history.

(56) References Cited

U.S. PATENT DOCUMENTS 6,105,068 A 8/2000 Naudus (Continued)

OTHER PUBLICATIONS

Call Signaling Protocols and Media Stream Packetization for Packet Based Multimedia Communications System, Feb. 1998 (CD).

(Continued)

*Primary Examiner*—Creighton Smith
(74) *Attorney, Agent, or Firm*—Stolowitz Ford Cowger LLP (57) ABSTRACT

A method for providing advanced intelligent network (AIN) supplementary services between an ITU H.323 endpoint and a service control point (SCP) having service logic programs (SLPs) and transaction capabilities applications part (TCAP) protocol support is described. The method preferably includes providing an ITU H.450 interface in the SCP, the ITU H.450 interface being capable of communicating with the ITU H.323 endpoint, and utilizing an ITU H.225 FACILITY message and an ITU H.450 application protocol data unit (APDU) to carry one or more of call-related information, operation codes and AIN messages between the ITU H.323 endpoint and the SCP. In a case in which the AIN supplementary services are not related to an existing ITU H.323 call, the ITU H.225 FACILITY message is empty. Alternatively, in a case in which the AIN supplementary services are related to an existing ITU H.323 call, the ITU H.225 FACILITY message is one of a variety of user-to-user information elements (UUIEs). The invented apparatus for supporting advanced intelligent network (AIN) supplementary services in a voice frame network preferably includes an ITU H.450.1 interface to a service control point (SCP), the SCP having also a transaction capabilities applications part (TCAP) interface to the public switched telephone network (PSTN), the SCP providing AIN supplementary services in a network environment compatible with an ITU H.323 endpoint, and an ITU H.323 endpoint interface for coupling to the ITU H.450 interface over the voice frame network, the ITU H.323 endpoint interface supporting an ITU H.450-based communications protocol.

20 Claims, 6 Drawing Sheets

U.S. PATENT DOCUMENTS

| | | | |
|---|---|---|---|
| 6,373,839 B1 | 4/2002 | Clark et al. | |
| 6,430,699 B1 | 8/2002 | Carter et al. | |
| 6,442,268 B1 | 8/2002 | Klaghofer et al. | |
| 6,449,260 B1 * | 9/2002 | Sassin et al. | 370/270 |
| 6,466,662 B1 | 10/2002 | Klaghofer et al. | |
| 6,529,504 B1 * | 3/2003 | Sbisa | 370/385 |
| 6,549,569 B1 | 4/2003 | Beyda et al. | |
| 6,560,327 B1 * | 5/2003 | McConnell | 379/229 |
| 6,563,835 B1 * | 5/2003 | Chen | 370/410 |
| 6,614,784 B1 * | 9/2003 | Glitho et al. | 370/352 |
| 6,621,814 B1 | 9/2003 | Korpi et al. | |
| 6,636,596 B1 * | 10/2003 | Gallant et al. | 379/220.01 |
| 6,661,785 B1 | 12/2003 | Zhang et al. | |
| 6,693,898 B1 * | 2/2004 | Su et al. | 370/355 |
| 6,700,901 B1 | 3/2004 | Shaffer et al. | |
| 6,731,732 B2 | 5/2004 | Creamer et al. | |
| 6,751,222 B1 * | 6/2004 | Noake et al. | 370/356 |
| 6,868,090 B1 * | 3/2005 | Ma et al. | 370/469 |
| 7,002,988 B1 * | 2/2006 | Benedyk et al. | 370/467 |
| 7,023,837 B1 * | 4/2006 | Srinivasan | 370/352 |
| 7,180,888 B1 * | 2/2007 | Crouch et al. | 370/352 |
| 7,257,217 B1 * | 8/2007 | Lee | 379/265.01 |
| 2002/0018461 A1 | 2/2002 | Ma | |

OTHER PUBLICATIONS

Call Transfer Supplementary Service for H.323I, Sep. 1997 (CD).
Generic Functional Protcol for the Support of Supplementary Services in H.323, Date unknown (CD).

* cited by examiner

ITU H450.1-BASED ITU H.323 SCP METHOD AND APPARATUS

This application is a continuation of prior U.S. Ser. No. 09/608,276, filed Jun. 30, 2000 now U.S. Pat. No. 6,868,090.

BACKGROUND OF THE INVENTION

The present invention concerns support of advanced intelligent network (AIN) services in voice frame networks using protocols such as voice over Internet protocol (VoIP) based upon the ITU-T 450.1 standard, which is the supplementary services protocol framework within ITU-T H.323 networks.

AIN is the Bellcore term for such intelligent network services, and Intelligent Network (IN) is the ITU-T term. Both terms convey the idea of a network that provides a platform to deploy user services in a fast and efficient manner. Since they are very similar in the services they provide and the network architectures, the term AIN is used through this patent application. However, the present invention can be used for both AIN and IN without any modification.

A fundamental aspect of AIN is the ability to support the quick creation of services for the end customer. The AIN uses technology of Signaling System number 7 (SS7) and adds its functionality at the application layer to achieve goals like:

1) Provide timely creation of new services for the customer;
2) Support a wide range of services;
3) Support efficient maintenance of the AIN system;
4) Enforce a seamless environment between vendors' systems; and
5) Automate services that entail operator intervention.

One of the most important AIN network elements to achieve these goals is the service control point (SCP). It contains Service Logic Programs (SLPs) and associated data to provide AIN services, such as 800 numbers, credit verification, and so on. Sometimes, the services provide by the SCP are also called supplementary services in order to differentiate the basic call services provided by the switch services point or SSP, another important AIN network element. The SSP is responsible for basic call processing operations and the switching operations to move the signaling traffic through the network. The SSP uses the signaling traffic to set up a connection. The basic call services include call origination authorization, dialed address information collection and analysis, and so on.

A related AIN application is the provision in a voice frame network of an interface between an intelligent peripheral such as an interactive voice response unit and a gatekeeper. Such an interface based on ITU H.323 and H.450 is described in co-pending U.S. patent application Ser. No. 09/609,201, filed Jun. 30, 2000 entitled VOICE FRAME NETWORK GATEKEEPER-TO-INTELLIGENT PERIPHERAL INTERFACE METHOD AND APPARATUS. The co-pending patent application is assigned in common with the present application to Cisco Technology, Inc. and its disclosure is incorporated herein by this reference.

Those of skill in the art will appreciate that the referenced ITU and related standards are well known, evolving standards. Accordingly, reference herein to these standards will be understood to mean the standards as they existed at the time of the earliest effective filing date of the present application, and as they have evolved to date, and as they continue to evolve over the term of any patent that issues herefrom. Applicants note that an instructive earlier version of the ITU H.450.1 standard is described in *Generic functional protocol for the support of supplementary services in H.323*, date unknown, and that various ones of the ITU-T standards are described in *Call Signaling Protocols and Media Stream Packetization for Packet Based Multimedia Communications Systems*, February 1998 and *Call Transfer Supplementary Service for H.323I*, September 1997.

Figure 1:
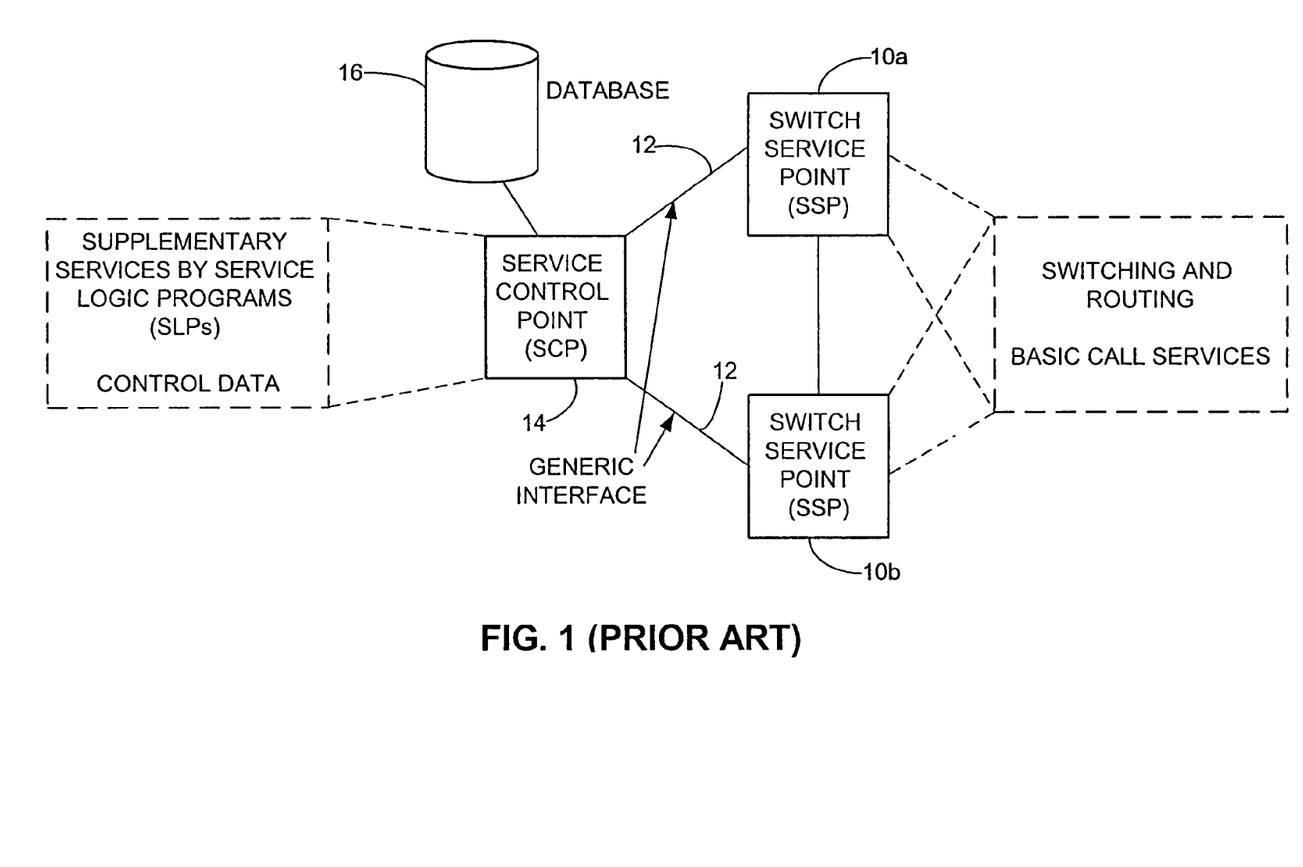
FIG. 1 is a block diagram showing a conventional advanced intelligent network (AIN) architecture.

FIG. 1 shows the conventional AIN architecture wherein one or more SSPs 10a, 10b are connected via a generic interface 12 to a SCP 14 having a database 16 connected therewith. SCP 14 will be understood by those of skill in the art to provide one or more supplementary services via so-called service logic programs (SLPs) and needed control data for implementing desired SCP functions, as are known. SSPs 10a, 10b will be understood by those of skill in the art to provide call switching and routing functions as well as basic call services, as are also known.

Figure 2:
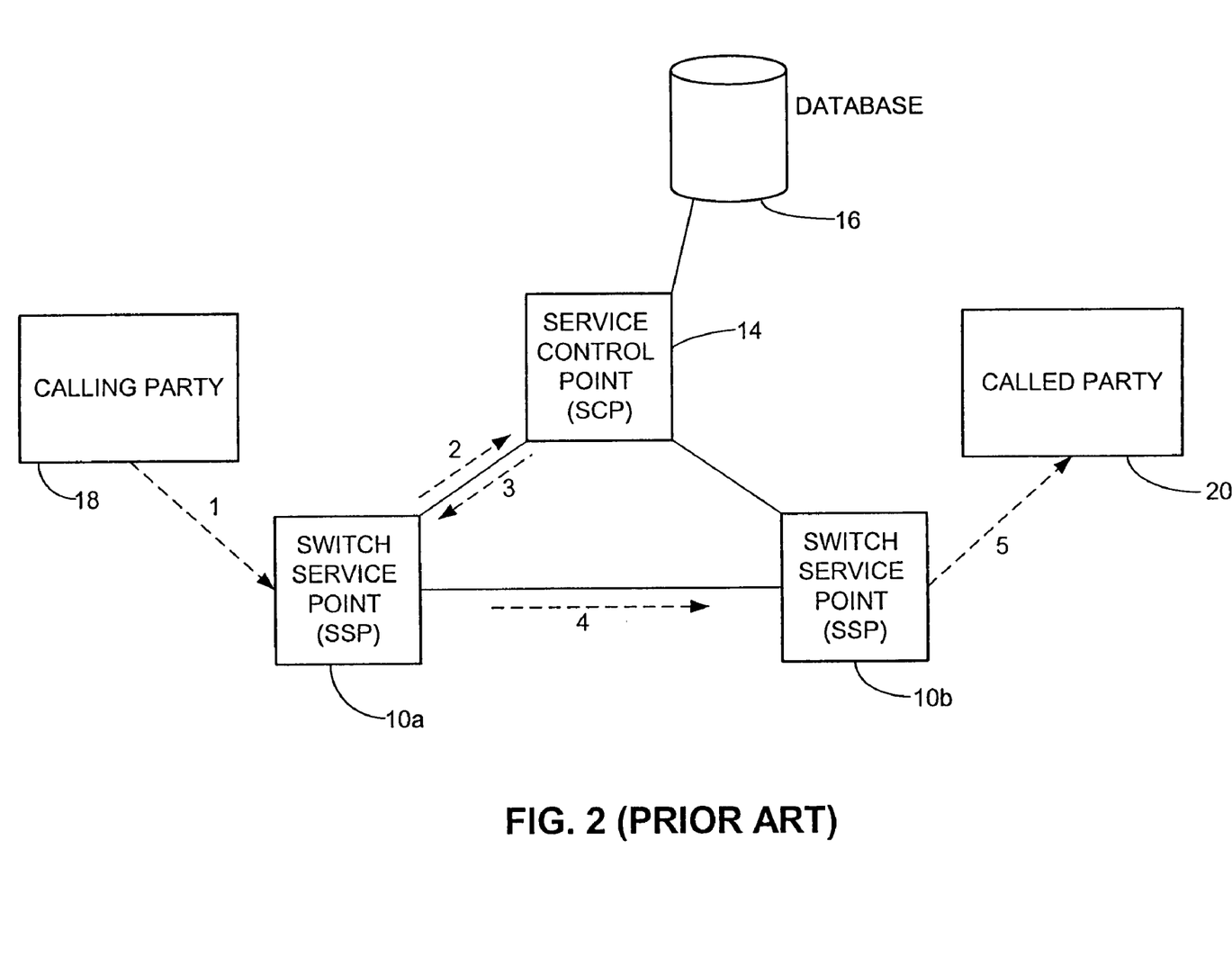
FIG. 2 is a block diagram showing how call and supplemental services support a calling and called party in the conventional AIN architecture of FIG. 1.

Instead of tailored messages for a specific service, the AIN architecture uses a common set of standardized messages for a variety of services. Thus, the switch call processing and the SCP database processing support a common interface to, for example two different SSPS, as shown in FIG. 2. FIG. 2 is similar to FIG. 1 and further shows the routing via dashed lines of various message components among SSPs 10, 10b, SCP 14, a calling party 18 and a called party 20.

A typical AIN session proceeds as follows (wherein the numbers on the dashed lines in FIG. 2 correspond with the numbered steps below):

1) A calling party dials in to network.
2) SSP makes query to SCP on a common interface, such as SS7 (in 800 number service, SSP sends query to SCP to get routable address information).
3) SCP returns the replay that contains the requested information (in 800 services, SCP returns the SSP with a number, such as 949-823-1146, and the SSP uses its call processing to route the call).
4) SSP associated with the calling party sets up the connection to the SSP associated with a called party.
5) The terminating SSP sets up the connection to the called party.

As mentioned above, both Bellcore AIN and ITU-T IN services are deployed by SS7 networks. More precisely, the SS7 TCAP (Transaction Capabilities Applications Part) is the protocol that carries the common set of standardized messages of AIN services between a SCP and one or more SSPs.

Figure 3:
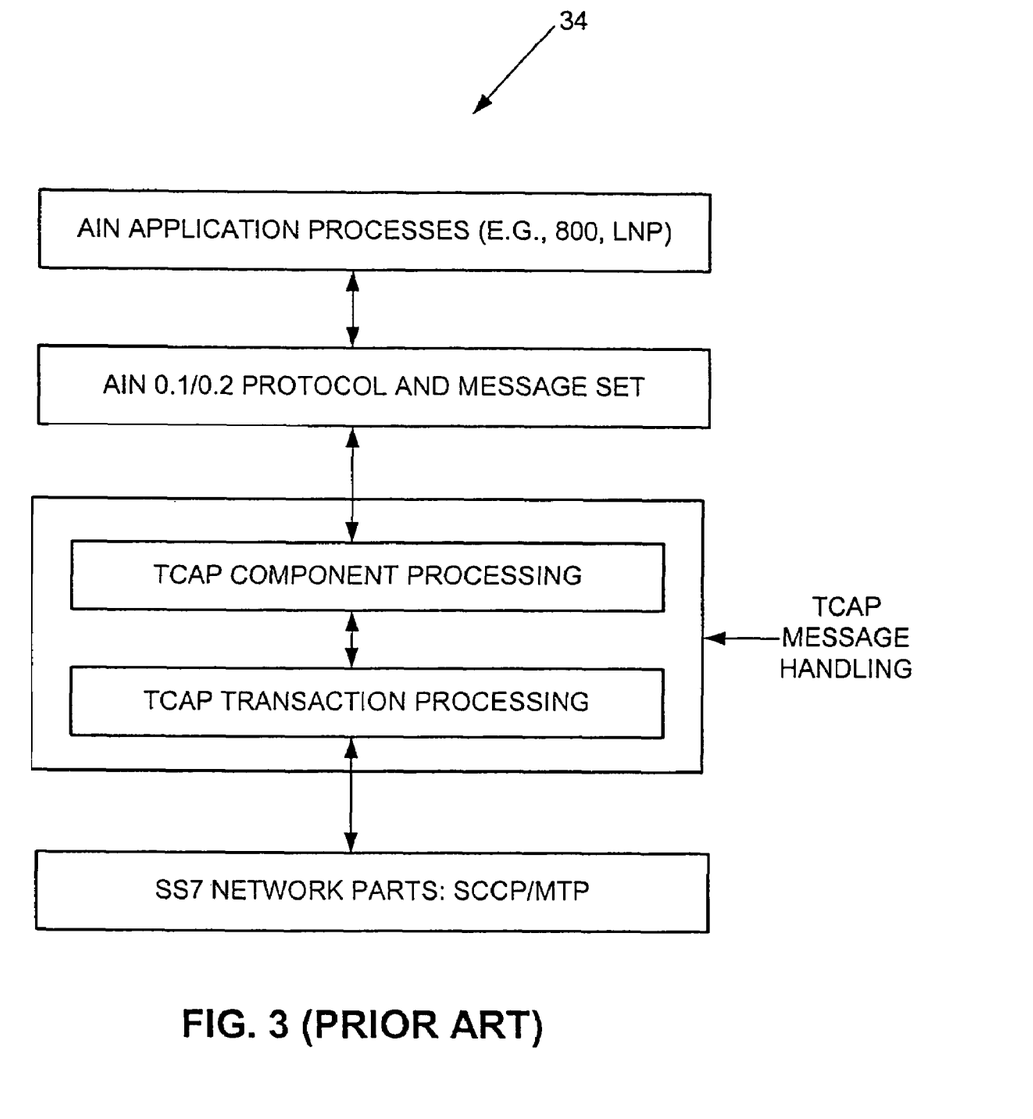
FIG. 3 is a block diagram showing the conventional layered protocol architecture of the transaction capabilities applications part (TCAP) and AIN services supported by the service control point (SCP).

FIG. 3 illustrates the conventional protocol architecture 34 for TCAP-based SCP by which the TCAP transaction and component and processing as layers over the SS7 network provides a TCAP message handling interface 46 between the AIN 0.1/0.2 protocol and message set 44 and application processes 42 and the SS7 network and SCCP/MTP protocol 48. Those of skill in the art will appreciate that TCAP functions are grouped into two portions: a transaction portion 50 and a component portion 52.

The transaction portion 50 identifies whether the TCAP transaction is expected to include single or multiple messages and provides an application-level associated over which components are exchanged. Also, the transaction portion 50 provides a way to indicate whether its content is the only message in this exchange or the portion of the message in an extended exchange of information (i.e., first, middle, last). This is necessary in SS7 networks since a SS7 message can not exceed 272 bytes. If a SS7 message for an AIN service contains more than 272 bytes, it will be broken into more than one piece, with each piece being fitted into one SS7 message.

An understanding of the AIN architecture and services leads to the conclusion that the SCP functionality is independent of the basic call services provided by the SSP, as long as both SCP and SSP access through a common interface. In other words, the supplementary services provided by SCP can be used to serve for other network architectures, such as ITU H.323 networks to provide same voice services as SSPs in a public switched telephone network (PSTN) context. This is the inspiration for an invention that provides AIN services in ITU H.323 networks by using a SCP, a SCP based on ITU H.450.1, the supplementary services protocol framework in ITU H.323 networks.

SUMMARY OF THE INVENTION

A method for providing advanced intelligent network (AIN) supplementary services between an ITU H.323 endpoint and a service control point (SCP) having service logic programs (SLPs) and transaction capabilities applications part (TCAP) protocol support is described. The method preferably includes providing an ITU H.450 interface in the SCP, the ITU H.450 interface being capable of communicating with the ITU H.323 endpoint, and utilizing an ITU H.225 FACILITY message and an ITU H.450 application protocol data unit (APDU) to carry one or more of call-related information, operation codes and AIN messages between the ITU H.323 endpoint and the SCP. In a case in which the AIN supplementary services are not related to an existing ITU H.323 call, the ITU H.225 FACILITY message is empty. Alternatively, in a case in which the AIN supplementary services are related to an existing ITU H.323 call, the ITU H.225 FACILITY message is a user-to-user information element (UUIE) including one or more of a setup-UUIE, a connect-UUIE and a releaseComplete-UUIE.

The invented apparatus for supporting advanced intelligent network (AIN) supplementary services in a voice frame network preferably includes an ITU H.450.1 interface to a service control point (SCP), the SCP having also a transaction capabilities applications part (TCAP) interface to the public switched telephone network (PSTN), the SCP providing AIN supplementary services in a network environment compatible with an ITU H.323 endpoint, and an ITU H.323 endpoint interface for coupling to the ITU H.450 interface over the voice frame network, the ITU H.323 endpoint interface supporting an ITU H.450-based communications protocol.

DETAILED DESCRIPTION OF THE INVENTION

Briefly summarizing the applicable international standards, ITU H.323 has been used as a baseline standard that references other ITU-T standards:

H.225.0:
RAS (Registration, Admission, and Status) protocol uses H.225 message to perform registration, admissions, bandwidth changes, status, and disengage procedures between endpoints and a Gatekeeper (GK).

The call signaling function uses H.225 call signaling to establish the connection between two H.323 endpoints.

RTP/RTCP (Real-Time Transfer Protocol/Real-Time Control Protocol) are used for media and control message format.

H.345: describes the messages and procedures used for opening and closing logical channels for audio, video, and data; capability exchange; mode requests; control; and indications.

H.450.x: in conjunction with the call signaling protocol defined in H.225.0, H.450.1 provides the H.323 entities a generic functional protocol for the control of supplementary services. This is entirely independent of any existing H.323 calls. The supplementary services are designed either in other H.450.x (x>1) or by a manufacturer.

There is no size limitation on a H.323 message. Therefore, the Transaction Portion is not necessary when a SCP is used in H.323 networks. Since message size limitation is absent in H.323 networks, only four APDUs (returnResultNotLast OPDU not being required) are sufficient for a H.323 SCP.

Figure 4:
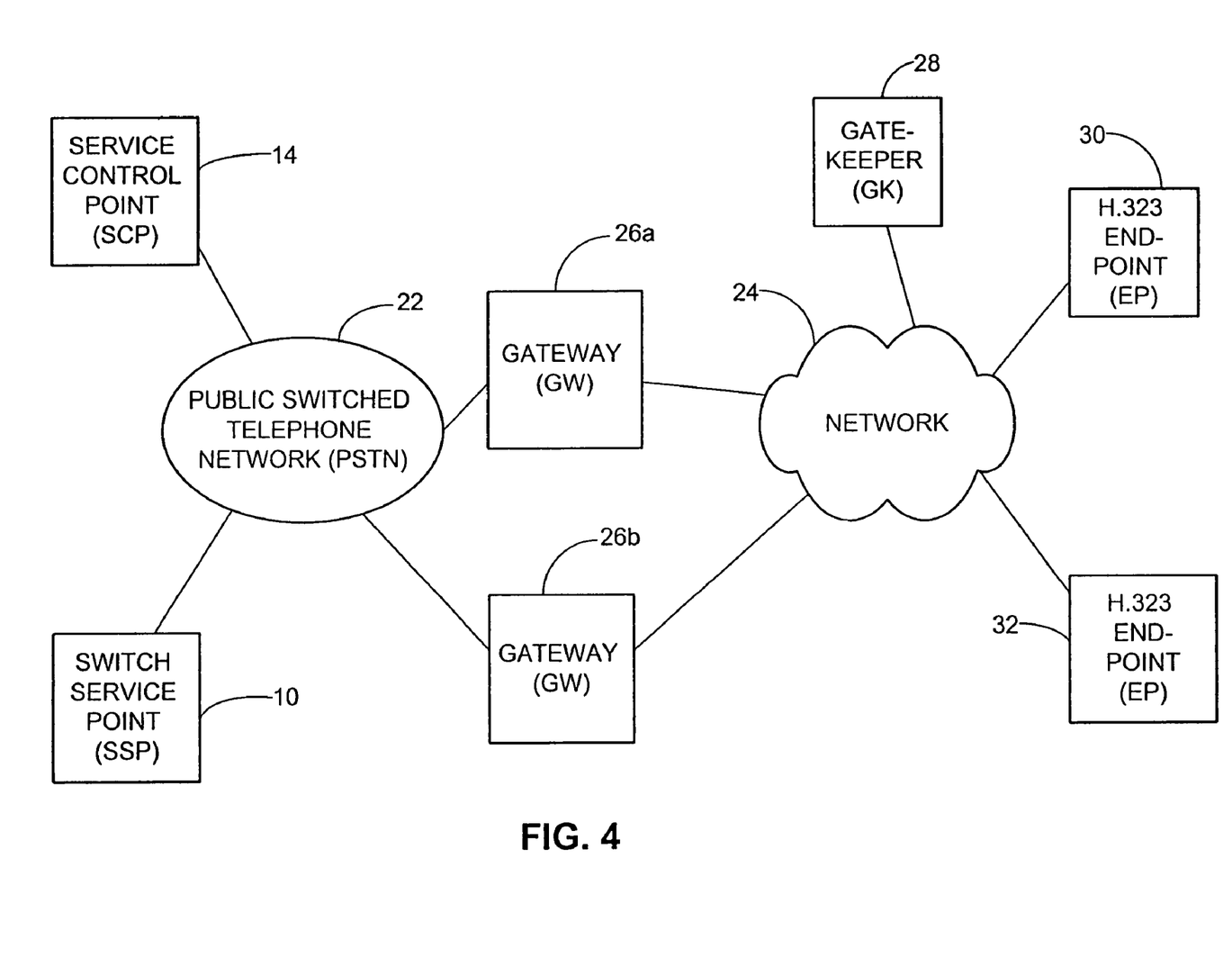
FIG. 4 is a block diagram illustrating an ITU H.323 network having gatekeepers and endpoints and a PSTN having SCPs and SSPs, the network and the PSTN being linked together via gateways.

FIG. 4 shows an example of a H.323 network for voice frame network such as VoIP services. FIG. 4 illustrates how a PSTN 22 and a network 24 such as the Internet are made to communicate via one or more gateways (GWs) 26a, 26b. PSTN 22 may be seen to provide access to a SCP 14 and an SSP 10. Network 24 may be seen to provide access to a gatekeeper (GK) 28 and one or more ITU H.323 endpoints (EPs) 30, 32. Notably, the illustrated architecture provides no access to AIN services provided by SCP 14 and SSP 10 to a ITU H.323 gatekeeper 28, endpoint 30, 32 or other ITU H.323 entity. This is the problem addressed by the present invention.

In the current H.323 network architectures, basic call services (via H.225 call signaling protocol) and supplementary services (via H.450.x) are controlled by the H.323 endpoints (e.g., gateway (GW)), and gatekeeper (GK) as an option. This situation is very similar to the early telephone network, in which the switches contain not only basic call service program and switching capabilities but also control data and supplementary service programs. In that early telephony environment, it was hard to make timely release to software; it is even harder to build new services. AIN changed the situation by introducing SCP and removing the supplementary service programs and control data from switches to a centralized SCP (see FIG. 1).

From FIG. 4 it may be appreciated by those of skill in the art that to provide the same AIN services to a H.323 network, it is necessary to provide an interface by which H.323 gateway or gatekeeper or other H.323 endpoints can access the SCP. Two methods of providing such access seem plausible:

1. The SS7 TCAP is used to exchange AIN messages between one or more SSPs and a SCP. Accordingly, one method would be to add SS7 TCAP to related H.323 entities so that they can access a SCP in the conventional way.

2. Instead of using SS7 TCAP, H.450.1 might be used to carry AIN messages between H.323 entitles and SCP.

Method 1 would require two network interfaces, H.323 and SS7 TCAP, for each H.323 entity that requires access to a SCP. From a network management point of view, this approach would require the H.323 network operator to manage an additional expensive SS7 network.

Method 2 would provide a much more efficient and economical way to let a H.323 entity to access SCP. Since H.450.1 is part of the H.323 protocol (which will be supported by most H.323 entities), the AIN call model could be added to the H.323 entities and the same H.323 network could be used to access a SCP. With the SCP as a central feature in such an AIN supplemental services system, adding a H.450.1 protocol to it is more straightforward and less expensive than adding SS7 TCAP to many H.323 entities.

The invented H.450.1-based SCP will now be described, as will the problems associated with the use of H.450.1 that the present invention solves.

ITU-T H.450.1 provides the H.323 entities a generic functional protocol for the control of supplementary services, but leaves the specification of such function and control to the user. Two types of functionality are required in the AIN-over-VoIP context.

1. For supplementary services that are related to existing H.323 calls or entities that participate in the call, e.g. Call Transfer defined in H.450.2, a H.450 APDU can be carried by H.225.0 call signaling message through the existing call signaling channels.
2. For supplementary services that are entirely independent of any H.323 existing calls, e.g. a database query from a H.323 entity to a SCP, the SCP simply provides requested information to the H.323 entity and is not a participant of the existing call. In H.225.0, this is achieved by using an empty H.323 user-to-user information element (UUIE) FACILITY message with the H.450 application protocol data unit (APDU).

For type 1 supplementary services, the H.225 call signaling message contains a non-empty H.323-UUIE and a H.450.1 APDU. The non-empty H.323-UUIE carries existing call related information, and the H.450 APDU contains an application code for a specific supplementary service. The non-empty H.323 UUIE can be a setup-UUIE, a connect-UUIE, a releaseComplete-UUIE, etc. Any other non-empty H.323 function may be provided, within the spirit and scope of the invention.

Since the type 2 services are not related to existing H.323 calls, the H.323-UUIE in H.225 call signaling message is set empty. Under H.323, only the H.225 FACILITY message can carry an empty H.323-UUIE. Thus, in this specific FACILITY message, the H.450.1 APDU is used to carry application messages, such as an AIN message.

Unlike SS7 TCAP, H.450.1 is modeled after Remote Operations Service Element (ROSE) and defines a total of four APDUs (which are referred to in ROSE as operation protocol data unit (OPDU). The H.450.1 APDUs preferably include 1) invoke APDU;
2) returnResultLast APDU;
3) returnError APDU; and
4) reject APDU.

As mentioned above, the returnResultNotLast OPDU defined in TCAP is used to overcome the size limitation for a SS7 message. It permits a result to be segmented if its size exceeds the 272-byte limitation. However, there is virtually no size limitation for a H.450.1 APDU and a H.323 message. The returnResultNotLast OPDU is not needed for H.450.1 to carry an AIN message. Therefore, H.450.1 can be used in accordance with the invention to provide the functions of the conventional TCAP Component Portion (refer to FIG. 3).

ITU H.450.1 provides no counterpart to the Transaction Portion in SS7 TCAP. However, most of the Transaction Portion functionality is not required for H.450.1-based SCP.

Accordingly, a H.450.1-based SCP can be defined as follows. A H.450.1-based SCP contains Service Logic Programs (SLPs) and associated data to provide AIN services, such as 800 numbers, credit verification, and so on. It uses a specific H.225 empty FACILITY message plus H.450.1 protocol to carry AIN messages for exchanging information with other H.323 entities.

Figure 5:
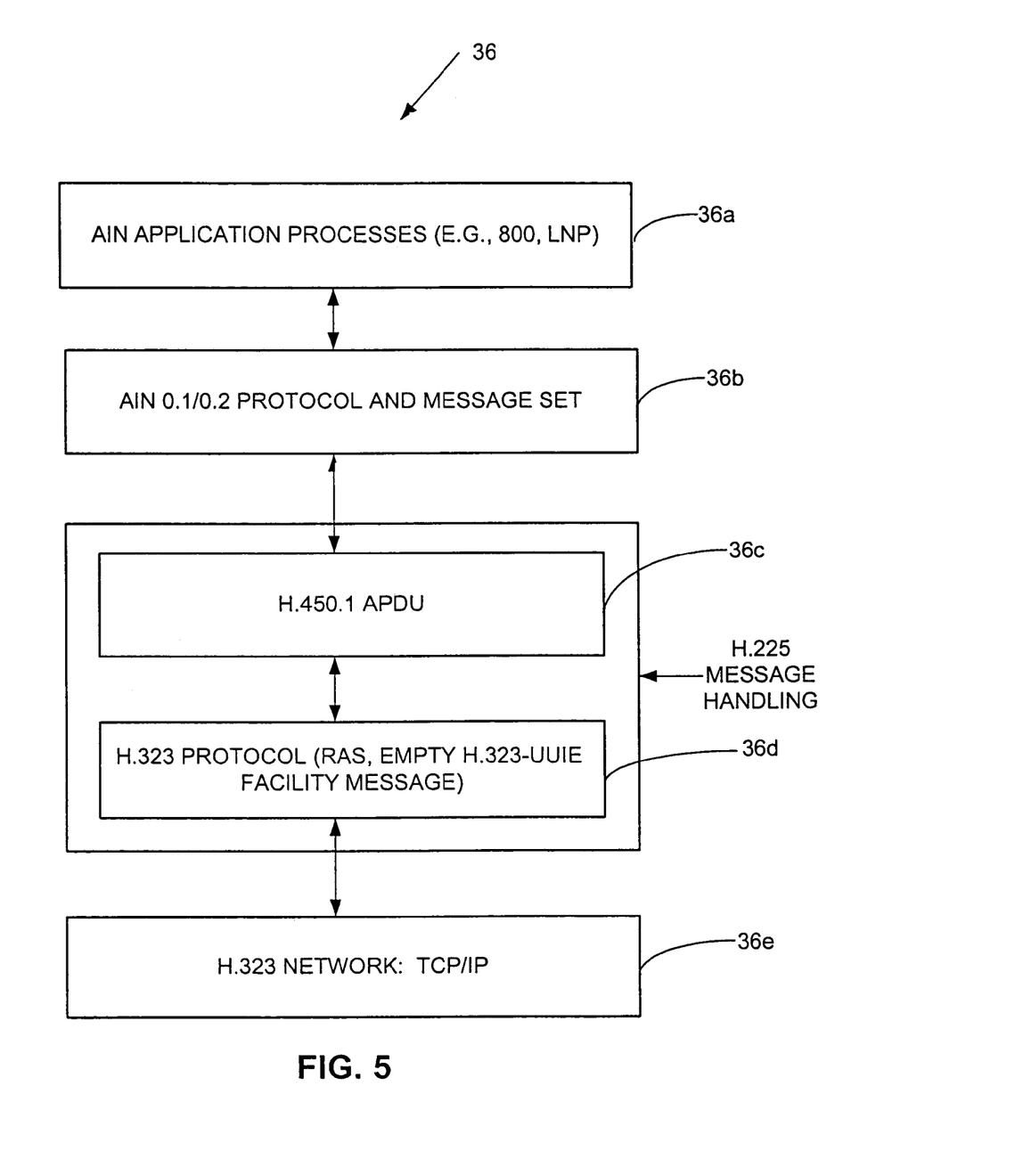
FIG. 5 is a block diagram illustrating the layered protocol architecture of an ITU H.450.1-based ITU H.323 SCP.

FIG. 5 shows the protocol architecture 36 for H.450.1-based SCP by which the H.450.1 APDU 36c as a layer over the H.323 protocol 36d provides a H.225 message handling interface between the existing AIN 0.1/0.2 protocol and message set 36b and application processes 36a and the H.323 network and TCP/IP protocol 36e. Those of skill in the art will appreciate by contrasting FIG. 5 with FIG. 3 that H.450.1 provides no transaction sub-layer as does TCAP. Only the Invoke ID operation is available to maintain a conversation between a H.323 SCP and a GK. The transaction ends when the OPERATION Return Result or Return Error or Reject is received. However, most current AIN services, e.g. 800 and LNP, use only a single query-response transaction between an SSP and the SCP. Accordingly, this seeming limitation of H.450.1—whereby it provides no transaction sub-layer or multiple component capability—is overcome in accordance with the invention.

Figure 6:
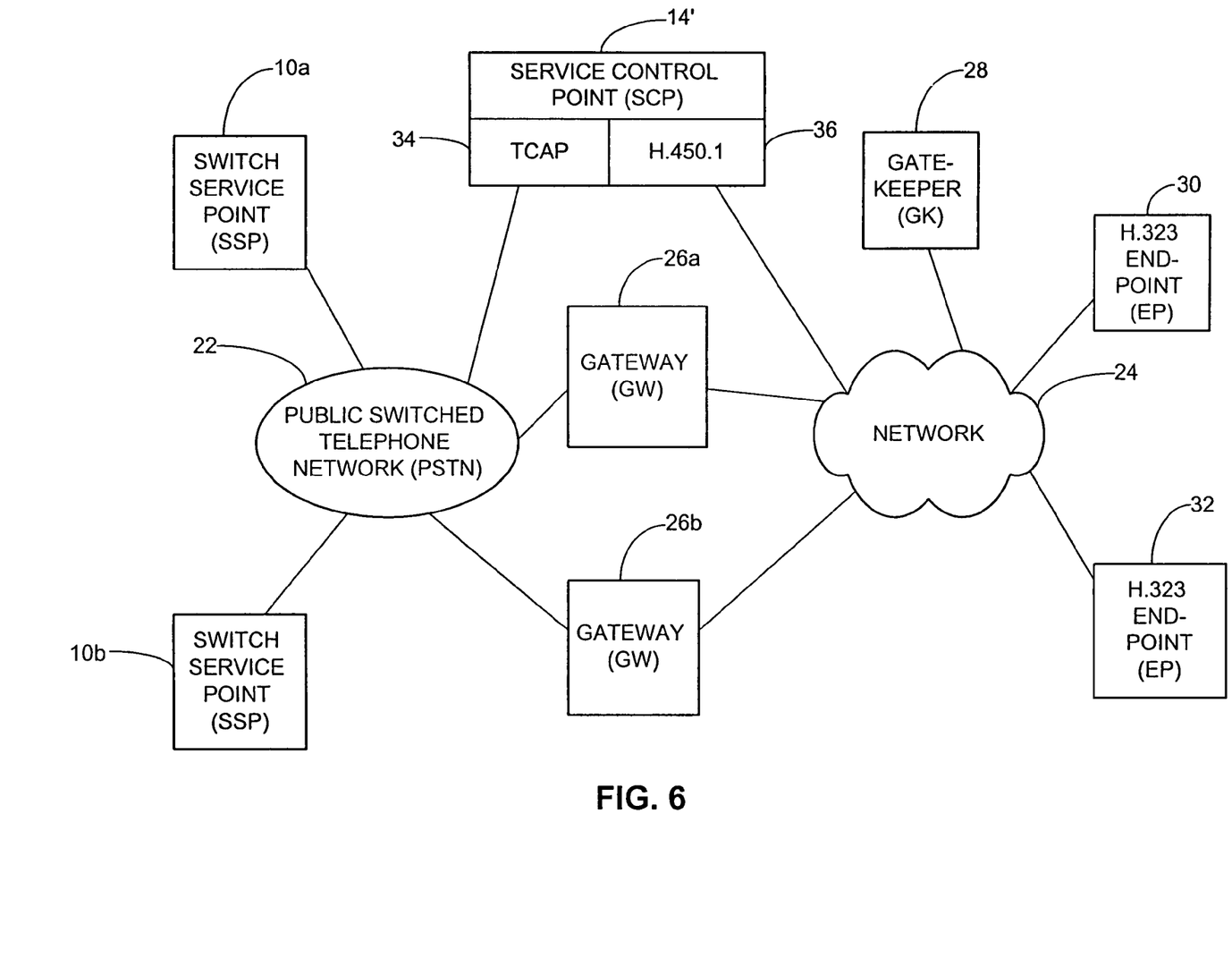
FIG. 6 is a block diagram illustrating an ITU H.323 network architecture in accordance with a preferred embodiment of the invention.

FIG. 6 shows a preferred embodiment of the H.450.1-based SCP invention. For some VoIP service providers, the H.450.1-only based SCP made in accordance with the invention can be installed in their H.323 networks if they do not own a conventional SCP. A traditional phone service provider, e.g. AT&T™ or MCI™, can add an H.450.1 interface to its existing SCP so that AIN services can be provided homogeneously to its PSTN and H.323 network customers. Moreover, existing TCAP-based SCP AIN services can be ported to the H.323 SCP without major modification. Thus, the invention enables Telco service providers to sell (or port) existing AIN services to Internet telephony service providers (ITSPs) so that the ITSPs need not develop the same AIN service programs in the VoIP environment.

This is illustrated in FIG. 6, which is similar to FIGS. 1 and 4. In FIG. 6, identical elements from FIG. 4 are identically reference designated. The important difference in FIG. 6 is the provision in accordance with the invention of an interface module to the existing SCP to enable the invented SCP 14' to interface not only via TCAP on PSTN 22 (via TCAP interface 34) but also via H.450.1 on voice frame network 24 (via H.450.1 interface 36). SCP 14' will be understood to be identical with conventional SCP 14 but for the addition of the H.450.1 interface and the protocols defined herein for communicating supplemental services information between SCP 14' and a H.323 gatekeeper, endpoint or other entity.

Referring again briefly to FIG. 5, ITU H.450.1 interface 36 may be seen preferably to include an AIN application processes program layer 36a configured to support AIN supplementary services; an AIN protocol and message set program layer 36b operatively coupled with said application processes program layer; a H.450.1 APDU program layer 36c operatively coupled with said protocol and message set program layer; a H.323 protocol program layer 36d operatively coupled with said H.450.1 APDU program layer; and a H.323 network program layer 36e operatively coupled with said H.323 protocol program layer, said H.323 network program layer being configured for TCP/IP connection with the voice frame network. Interface 36, as configured in accordance with a preferred embodiment of the invention is implemented in software having the various layers described above, although alternative configurations are contemplated, and are within the spirit and scope of the invention.

Those of skill in the art will appreciate that the functions and operations described herein are illustrative only and that the invention is not so limited. Those of skill in the art also will appreciate that the H.450.1-based SCP functionality made possible by the invented method and apparatus is transparent to other voice frame network devices including other H.323-compatible devices, and to other TCAP devices. This ensures its broad compatibility in network design with the installed base of SSPs, SCPs, the PSTN, AIN and H.323 or other voice frame network equipment.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

The invention claimed is:

1. A method for providing network services related to an existing call, comprising:
   sending call signaling protocol messages over a voice frame network with a service protocol interface of a service control point device that is coupled with a circuit-switched network, the call signaling protocol messages carrying one or more of call-related information, operation codes, and network messages, including one or more of a setup, connect, or release element.

2. The method of claim 1 including sending an empty call signaling protocol message when the network services are not related to the existing call.

3. A network processing device for providing network services, comprising:
   a service control point coupled to a circuit-switched network, the service control point including a service protocol interface configured to communicate over a packet switched network using a call signaling protocol message related to an existing call, the call signaling protocol message including one or more of a setup, connect, or release element.

4. The network processing device of claim 3 wherein the service protocol interface sends an empty call signaling protocol message when the network services are not related to an existing call.

5. The network processing device of claim 3 wherein the service protocol interface operates:
   an application processes program configured to support network services;
   a service protocol and message set program communicating with the application processes program;
   a data program communicating with the service protocol and message set program;
   a network protocol program communicating with the data program and configured for TCP/IP connection with the packet switched network; and
   a network program communicating with the network protocol program.

6. A computer-readable medium including instructions that when executed comprise:
   an application processes program layer configured to support network services;
   a service protocol and message set program layer communicating with the application processes program layer;
   a data program layer communicating with the service protocol and message set program layer;
   a network protocol program layer communicating with the data program layer;
   a network program layer communicating with the network protocol program layer configured for Transmission Control Protocol/Internet Protocol (TCP/IP) connectivity over a voice frame network; and
   a call signaling protocol sending messages including one or more of a setup, connect, and release element.

7. A computer-readable medium containing a program for providing network services, the program comprising:
   instructions for communicating with an endpoint over a voice frame network;
   instructions for communicating with a network services application program layer;
   instructions for implementing a service protocol using one or more data units to carry one or more of call-related information, operation codes and network messages; and
   instructions for sending call signaling protocol messages that include one or more of a setup, connect, and release element.

8. The computer-readable medium of claim 7 which further comprises:
   instructions for carrying the one or more call-related information, operation codes and network messages using the call signaling protocol messages and the one or more data units.

9. The computer-readable medium of claim 8 including instructions to send an empty call signaling protocol message when the network services are not related to an existing call.

10. A method for providing network services comprising:
    using an interface in a packet switched network that operates a call signaling protocol message to perform one or more operations including an invoke operation, a return on last result, a return on error, and a reject request.

11. The method of claim 10 including sending an empty call signaling protocol message and a data unit including an application message when the network services are not related to an existing call.

12. The method of claim 10 wherein the invoke operation maintains communications between endpoints.

13. The method of claim 10 wherein the network services operate with voice frame network devices.

14. The method of claim 13 wherein the network services are implemented on an H.323 network by adding a service control point with an H.450 interface.

15. The method of claim 13 wherein the network services are provided by adding an H.450 interface to a service control point that operates with a public switched telephone network and an H.323 network.

16. The method of claim 13 wherein network services on the public switched telephone network are ported to a service control point on an H.323 network.

17. A service control point for providing network services comprising:
    an interface that uses a service protocol for sending call signaling protocol messages over a packet switched network that invoke one or more of a return on last result, return on error, reject request, and invoke operation.

18. The apparatus of claim 17 wherein the network services operate with voice frame network devices using the service protocol.

19. A system for supporting network services in a voice frame network, comprising:

means for providing an ITU H.450 interface in a Service Control Point (SCP), the ITU H.450 interface communicating with an ITU H.323 endpoint in a packet switched network;

means for utilizing an ITU H.225 FACILITY message and an ITU H.450 application protocol data unit (APDU) to carry one or more of call-related information, operation codes and AIN messages between the ITU H.323 endpoint and the SCP; and means for providing a transaction capabilities applications part (TCAP) interface to a Public Switched Telephone Network (PSTN), wherein the ITU H.225 FACILITY message is a user-to-user information element (UUIE) including one or more of a setup-UUIE, a connect-UUIE and a releaseComplete-UUIE.

20. The system of claim 19 wherein the AIN messages are not related to an existing ITU H.323 call and the ITU H.225 FACILITY message is empty.

* * * * *